Nov. 5, 1935.  F. PORSCHE  2,019,927
SCREW AND NUT STEERING GEAR FOR AUTOMOBILES
Filed May 26, 1932  2 Sheets-Sheet 1
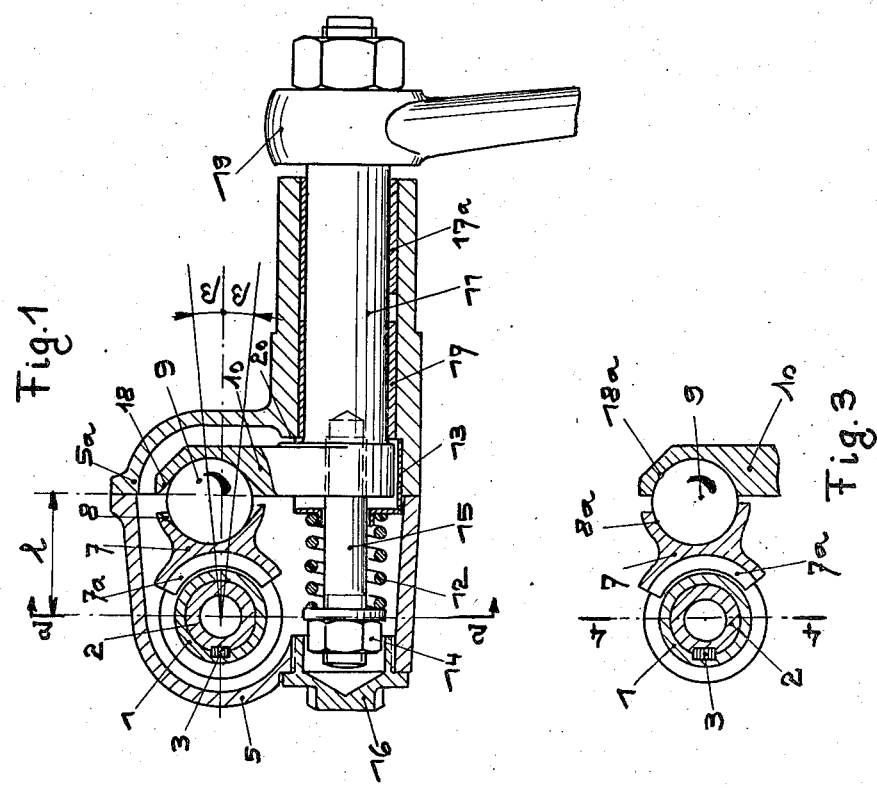
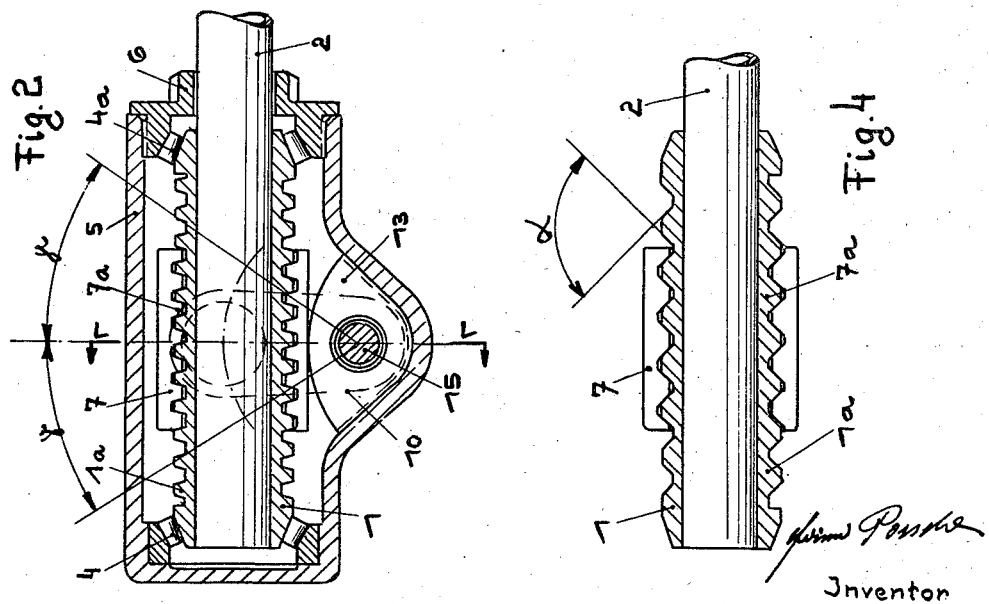

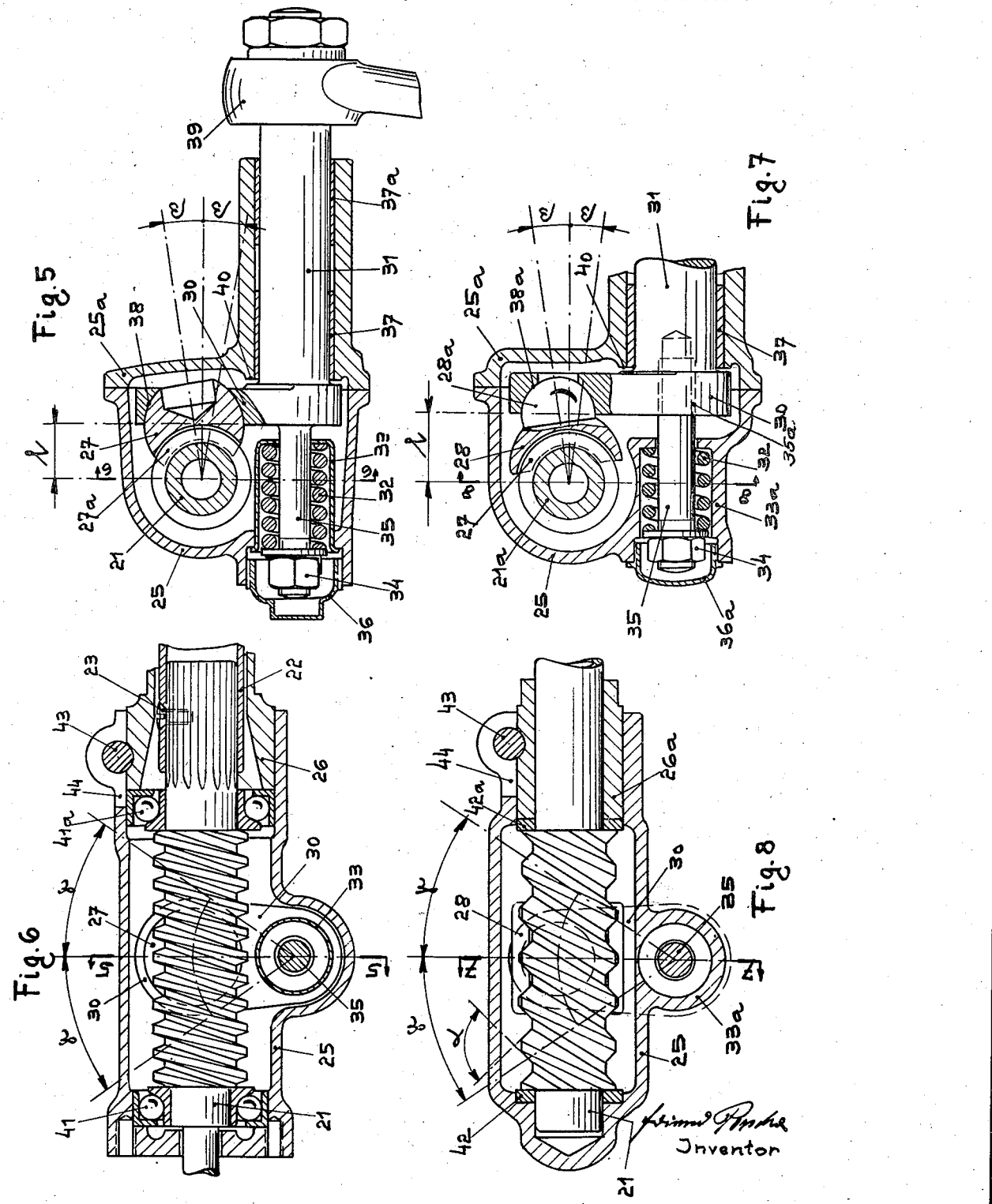

Patented Nov. 5, 1935

2,019,927

UNITED STATES PATENT OFFICE 2,019,927

SCREW AND NUT STEERING GEAR FOR AUTOMOBILES

Ferdinand Porsche, Stuttgart, Germany, assignor, by mesne assignments, of one-half to Auto Union A-G., Zschopau, Saxony, Germany Application May 26, 1932, Serial No. 613,781
In Germany May 26, 1931

9 Claims. (Cl. 74—500)

This invention relates to a screw and nut steering gear for automobiles and has in view the possibility of shock free steering and of an easy re-adjustment. These two requirements have not been completely fulfilled in former known steering mechanisms. With the steering rendered elastic by an internal spring, the shocks are only absorbed in an imperfect manner in spite of various complicated auxiliary devices. Expensive and complicated special constructions are required for re-adjusting the steering in consequence of the wear of the parts which are continually engaged with one another insofar as any re-adjusting is possible. Therefore, one generally limits the replacement of the transmission members of the steering mechanism to those parts which are subject to the most wear.

These difficulties are overcome by the present invention due to the special construction of the nut and its connection with the hinge bolt. The nut is formed as a nut segment and reposes only partially on the spindle approximately up to one-half of the surface of the spindle. The nut is set similar to a ball in a lever of the hinge bolt, which is influenced by an axial spring, in such a manner that the nut is continually pressed against the spindle. Thus two advantages are attained: First, the nut re-adjusts itself automatically in relation to the spindle, for which abundant play of its thread is provided; second, by simple devices the prejudicial shocks of steering are absorbed and thus maintained out of the steering column.

These devices consist either of the possibility of the rolling off of the ball, by means of which the nut is situated on the lever of the hinge bolt, in order to facilitate a relative movement between the lever and the nut, whereby the shock motion absorbed by the hinge bolt is transformed into a spring motion, or, if this relative movement between lever and spindle is to be avoided, the thread of the nut is provided with such a pitch that a relative movement between the spindle and nut takes place, that is a gliding off of the threads, whereby the shock motion is again transformed into a spring motion.

The invention is, in a detailed manner, explained in the drawings by four examples. The connection of the steering column with the hinge bolt is therein shown in different ways, namely:

Figs. 1 and 2 are sectional views of a connection including a ball between the nut and lever;

Figs. 3 and 4 are sectional views of a modified connection;

Figs. 5 and 6 are sectional views of a further modified connection; and

Figs. 7 and 8 are sectional views of still another modified connection.

In the example according to Figs. 1 and 2, the spindle 1 is fixed upon the steering column 2 and is in the form of a bush provided with a trapezoidal thread 1a, and is secured against rotation by means of a key 3 and against sliding motion by means of the rollers 4 and 4a bearing against angular surfaces. The spindle 1 together with the steering column 2 is rotatably mounted in the steering casing 5. Their assembly is effected by means of a nut 6. The segment or power transmitting member 7 engages the thread 1a of the spindle 1 but surrounds the spindle only part way around the side thereof. The segment 7 is provided upon the right side of the spindle 1, Fig. 1, with a certain clearance between the tops and bottoms of the threads 7a and threads 1a. A ball or supporting means 9 rests in suitable cups in the segment 7 and a lever 10 and they are provided with lateral flared out portions 8 and 18, and by means of the ball the segment 7 is connected with the lever 10 of the bolt 11. By means of a spring 12, the lever 10 is continually pressed against ball 9 and consequently the nut segment 7 against spindle 1. Spring 12 presses one end on the base 13 in the steering case 5a, and the other end against nut 14 on pin 15 which is secured in the hinge bolt 11. Spring 12 may be adjusted as to tension by means of the nut 14. The locking screw cap 16 in steering case 5 provides accessibility to the nut 14 from the outside. The steering lever 19 is secured on the extreme end of the hinge bolt 11, which is situated in the steering case 5a by means of the bushings 17 and 17a. A stop 20 on the steering case 5a limits the extent of outward motion of the hinge bolt.

The operation is as follows: If the spindle 1 is turned by the hand wheel on the upper end of the steering column 2, the nut segment 7 moves laterally, thereby taking along the lever 10 by means of the ball 9 which turns the hinge bolt 11 and consequently the steering lever 19. The lever describes a circle, and the nut segment 7 is, in case of larger deflections of the steering lever 10 turned by a small angle, the maximum which is designed in angle β in Fig. 1. This small turn of nut segment 7 is practically of no importance. In case of shocks, which, as is well known, cause an abrupt turn of the hinge bolt 11, the connection between lever 10 and ball 9 is loosened insofar as ball 9 attempts to roll off on the lateral sloping surfaces of the cups 8 and 18 is concerned. This can, however, only happen if the hinge bolt 11 is pressed outward in axial direction against the spring 12. The shock in the direction of the axis of the spindle is hereby transformed into a spring motion (normally in the direction of the axis of the spindle), without transmitting the shock through nut segment 7 upon the spindle 1 and the hand wheel. Spring 12 is adjusted in such a manner as to press the ball cup 18 with sufficient force against ball 9, so as to avoid, with normal steering resistances, a rolling off of ball 9 on the ball cups and consequently avoid lost motion. Through the wear of the gear teeth 1a and 7a the nut segment 7 is pressed deeper into the turns of the thread of spindle 1 through spring 12, thus engaging the teeth 1a and 7a continually and avoiding lost motion even through wear. To take care of such wear the thread is made with abundant point play.

In the example according to Figs. 3 and 4, the ball cups 8a and 18a are not provided with flared ends. On the other hand, the angle of point α (in Fig. 4) of the trapezoidal thread 1a and 7a is made considerably larger. All other parts remain unaltered.

In case of shocks the connection between the parts 7, 9, and 10 does not take up the shocks by this form of construction, as the ball 9 cannot roll off. It is rather the connection between the nut segment 7 and spindle 1 which takes care of shocks. Under the effect of the shock the flanks 7a of the nut segment 7 are gliding off the flanks 1a of spindle 1 in consequence of the proportionally great angle α of the thread. Here again the shock motion is in the same manner transformed into spring motion and the spindle 1 and the hand wheel are not influenced by the steering shocks.

In the example according to Figs. 5 and 6 the nut and ball, that is the power transmitting member and the supporting means are merged together in such a manner that the threads 27a are cut directly into the ball 27. For this purpose the ball 27 has been proportionally enlarged in comparison to that of the other constructions and it rests fully in a ball socket 38 of the lever 30. The thread 27a is cut out of the full spindle 21. The spindle 21 is mounted in the steering case 25 by means of shoulder ball bearings 41 and 41a. The bearing 41a is maintained in place by a bushing 26 which is connected with the steering case 25 by means of a clamp device 43 and 44. The spindle 21 is fixed on the steering column 22 and secured by a screw 23. The pin 35 is integral with the hinge bolt 31 and the lever 30. The spring 32 abuts against the socket 33 at one end and said socket is provided in the steering case. The screw cap 36 serves for the introduction of the socket 33, spring 32, and nut 34, and for adjustment of said spring.

With this construction the steering shocks cannot be absorbed in an elastic manner as no loosening of the connection can take place unless it should be desired to use a thread 21a with sloping teeth as in the preceding construction. The advantage of this construction is that, due to the shape of the nut 27, the distance l between the spindle 21 and lever 30 is considerably reduced. Thus lever 30 is positioned so close to the spindle that it is practically adjacent to the side of the spindle 21 with only sufficient clearance for the various positions of nut 27 during the rocking thereof. Hereby a considerably smaller and cheaper construction of the steering device is obtained.

In the example according to Figs. 7 and 8 the nut and ball or power transmitting member and supporting means are united in another way. Nut 28 has a semispherical section resting in a cup 38a of the lever 30. The pin 35 is here, contrary to the preceding construction, screwed into the hinge bolt 31 by means of the screw threads 35a. The spring 32 is placed in the chamber 33a of the steering case. The spindle 21 is resting directly in the steering case, that is in a bush 26a. It hereby contacts against the rings 42 and 42a. The ring 42a is adjusted by means of the said bush 26a. Bush 26a is connected, as in the preceding construction to the steering case by means of a clamp device 43 and 44.

The thread 21a having a large angle will render it possible to elastically absorb the steering shock as in the construction according to Figs. 3 and 4. Moreover, this construction also shows a considerable diminution of distance l compared with the constructions according to Figs. 1 to 4, even if this distance cannot be the minimum shown for example according to Figs. 5 and 6. Simplification and reduction of cost are decisive also for this type of construction.

With all the constructions care has been taken that, in case of breakage of the spring 12 or 32, which is not impossible, no loosening of the connection between the lever and spindle can take place, which would deprive the car of the proper control. To this effect a stop 20 or 40 is formed on the steering case 5a or 25a, which the lever 10 or 30 contacts immediately if and when the spring ceases to function. The connection of the parts 1, 7, 9 and 10 or 21, 27 and 30 or 21, 28 and 30 will hereby be loosened but will not become inoperative, a play existing between the lever and stop, which is considerably smaller than the height of the thread or the depth of the cup.

In order to reduce the cost of the nut segments, they may be manufactured in the form of full nuts, which afterwards can be cut into the separate segments.

Having now particularly described and ascertained the nature of my said invention, in what manner the same is to be performed, I declare, that what I claim is:

1. A steering gear according to claim 8 in which the supporting means is in the form of a ball inserted between the power transmitting member and the lever.

2. A steering gear according to claim 8 in which the supporting means is in the form of a ball inserted between the power transmitting member and the lever, and in which contact sockets are provided in the power transmitting member and the lever to contact with the ball and each socket having a flared-out portion at the edge thereof.

3. A steering gear according to claim 8, in which a ball is inserted between the power transmitting member and the lever, and in which the power transmitting member has a part-spherical surface contacting with the ball which is movably seated in the lever.

4. A steering gear according to claim 8, in which the power transmitting member and the supporting means form one element which is part spherical in form and seats in a part-spherical socket in the lever.

5. A steering gear according to claim 8, in which the power transmitting member and the supporting means are integral and the supporting means is provided with a part-spherical body seating into a part-spherical socket in the lever.

6. A steering gear particularly for vehicles, comprising a casing, a spindle having a thread thereon rotatably mounted in the casing and connected with a steering column, a bolt in the casing rotatably and slidably mounted in the casing having a lever secured thereto and a pin adjacent the lever, a power transmitting member threaded and corresponding to and meshing with the thread on the spindle and the member embracing at least two threads of the spindle with an embracing angle of at least 90° and not more than 180°, said member being between the lever and spindle, a base member provided in the casing adjacent the lever and bolt, an adjustable means on the end of the bolt, and a spring on the pin abutting at one end on the adjustable means and at the other end on the base member, said spring maintaining the bolt under tension to urge the power transmitting member against the spindle and the power transmitting member being capable of being rocked but is secured against rotation.

7. A steering gear according to claim 8, in which the threads on the spindle and in the power transmitting member are trapezoidal in form.

8. A steering gear particularly for vehicles, comprising a casing; a spindle having a thread thereon and being rotatably mounted in the casing and connected with a steering column; a power transmitting member having a thread on one face thereof which corresponds to and meshes with the thread of the spindle and embraces at least two threads thereof with an embracing angle of at least 90° and not more than 180°; a shaft rotatably and slidably mounted in the casing and having a lever secured thereto; spring means for pressing the power transmitting member against the spindle by means of the lever; and supporting means for supporting the power transmitting member at the lever, the supporting means and the mesh of the thread on the power transmitting member being so arranged as to permit rocking of the power transmitting member and to prevent rotation thereof.

9. Steering gear particularly for vehicles comprising a casing; a spindle having a thread thereon and being rotatably mounted in the casing and connected with a steering column; a power transmitting member having a thread on one face thereof which corresponds to and meshes with the threads of the spindle and embraces at least two threads thereof with an embracing angle of at least 90° and not more than 180°; a shaft rotatably and slidably mounted in the casing and having a lever securely mounted thereto; and spring means for pressing the power transmitting member against the spindle by means of the lever, said power transmitting member being supported on the lever in such a manner that the power transmitting member is capable of being rocked but is secured against rotation.

FERDINAND PORSCHE.